(12) United States Patent
Kondou et al.

(10) Patent No.: US 11,155,412 B2
(45) Date of Patent: Oct. 26, 2021

(54) WAREHOUSE MANAGEMENT SYSTEM AND WAREHOUSE MANAGEMENT METHOD

(71) Applicant: HITACHI TRANSPORT SYSTEM, LTD., Tokyo (JP)

(72) Inventors: Masaharu Kondou, Tokyo (JP); Ryota Kamoshida, Tokyo (JP); Hiroshi Yoshitake, Tokyo (JP); Yoriko Kazama, Tokyo (JP)

(73) Assignee: HITACHI TRANSPORT SYSTEM, LTD., Tokyo (JP)

( * ) Notice: Subject to any disclaimer, the term of this patent is extended or adjusted under 35 U.S.C. 154(b) by 611 days.

(21) Appl. No.: 16/080,713

(22) PCT Filed: Mar. 2, 2016

(86) PCT No.: PCT/JP2016/056421
§ 371 (c)(1),
(2) Date: Aug. 29, 2018

(87) PCT Pub. No.: WO2017/149695
PCT Pub. Date: Sep. 8, 2017

(65) Prior Publication Data
US 2021/0192659 A1    Jun. 24, 2021

(51) Int. Cl.
*G06Q 10/08* (2012.01)
*B65G 1/137* (2006.01)
(Continued)

(52) U.S. Cl.
CPC ............ *B65G 1/1378* (2013.01); *B62B 3/002* (2013.01); *B65G 1/1371* (2013.01);
(Continued)

(58) Field of Classification Search
CPC .................................................. B65G 1/1378
See application file for complete search history.

(56) References Cited

U.S. PATENT DOCUMENTS 5,171,120 A * 12/1992 Bernard, II .......... B65G 1/0485
198/347.2
7,979,359 B1 * 7/2011 Young .................... G06Q 10/06
705/332

(Continued)

FOREIGN PATENT DOCUMENTS

| CN | 103870952 A | 6/2014 |
| JP | H07-315521 A | 12/1995 |

(Continued)

OTHER PUBLICATIONS

Office Action, dated Aug. 27, 2019, which issued during the prosecution of Chinese Patent Application No. 201680082902.1, which corresponds to the present application (with English translation attached).

(Continued)

*Primary Examiner* — Thomas Randazzo
(74) *Attorney, Agent, or Firm* — Baker Botts L.L.P.

(57) ABSTRACT

A warehouse management system includes a controller provided with a storage unit which stores order information that associates items, numbers, and delivery destinations of articles, a warehousing priority calculation unit that determines warehousing priorities of a plurality of items of articles based on the items and quantities of the articles to be delivered to respective delivery destinations, as specified from the order information, and a warehousing instruction unit that outputs an instruction to store the articles based on the warehousing priorities.

10 Claims, 9 Drawing Sheets

(51) Int. Cl.
*G06Q 10/06* (2012.01)
*G06Q 50/28* (2012.01)
*G05B 19/418* (2006.01)
*B62B 3/00* (2006.01)

(52) U.S. Cl.
CPC . *G05B 19/41895* (2013.01); *G06Q 10/06315* (2013.01); *G06Q 10/087* (2013.01); *G06Q 50/28* (2013.01); *G05B 2219/32392* (2013.01)

(56) References Cited

U.S. PATENT DOCUMENTS

| | | | |
|---|---|---|---|
| 8,805,573 B2 | 8/2014 | Brunner et al. | |
| 9,466,045 B1* | 10/2016 | Kumar | G06Q 10/087 |
| 2006/0020366 A1* | 1/2006 | Bloom | B07C 3/02 |
| | | | 700/226 |
| 2007/0021864 A1 | 1/2007 | Mountz et al. | |
| 2008/0167933 A1* | 7/2008 | Hoffman | G06Q 10/087 |
| | | | 705/28 |
| 2009/0010741 A1* | 1/2009 | Burgstaller | B65G 1/1378 |
| | | | 414/266 |
| 2010/0274610 A1* | 10/2010 | Andersen | G06Q 10/087 |
| | | | 705/28 |
| 2015/0294260 A1* | 10/2015 | Napoli | G06Q 10/087 |
| | | | 705/337 |
| 2016/0054923 A1* | 2/2016 | Ishida | G06F 3/064 |
| | | | 711/165 |
| 2017/0313516 A1* | 11/2017 | Kazama | B65G 1/137 |
| 2017/0369245 A1* | 12/2017 | Suemitsu | G06Q 10/083 |

FOREIGN PATENT DOCUMENTS

| | | |
|---|---|---|
| JP | H09-309045 A | 12/1997 |
| JP | 2000-272722 A | 10/2000 |
| JP | 2005-324945 A | 11/2005 |
| JP | 2010-235238 A | 10/2010 |
| JP | 5377961 B2 | 12/2013 |

OTHER PUBLICATIONS

International Search Report, dated Jun. 7, 2016, which issued during the prosecution of International Application No. PCT/JP2016/056421, which corresponds to the present application.

* cited by examiner

[FIG. 1]
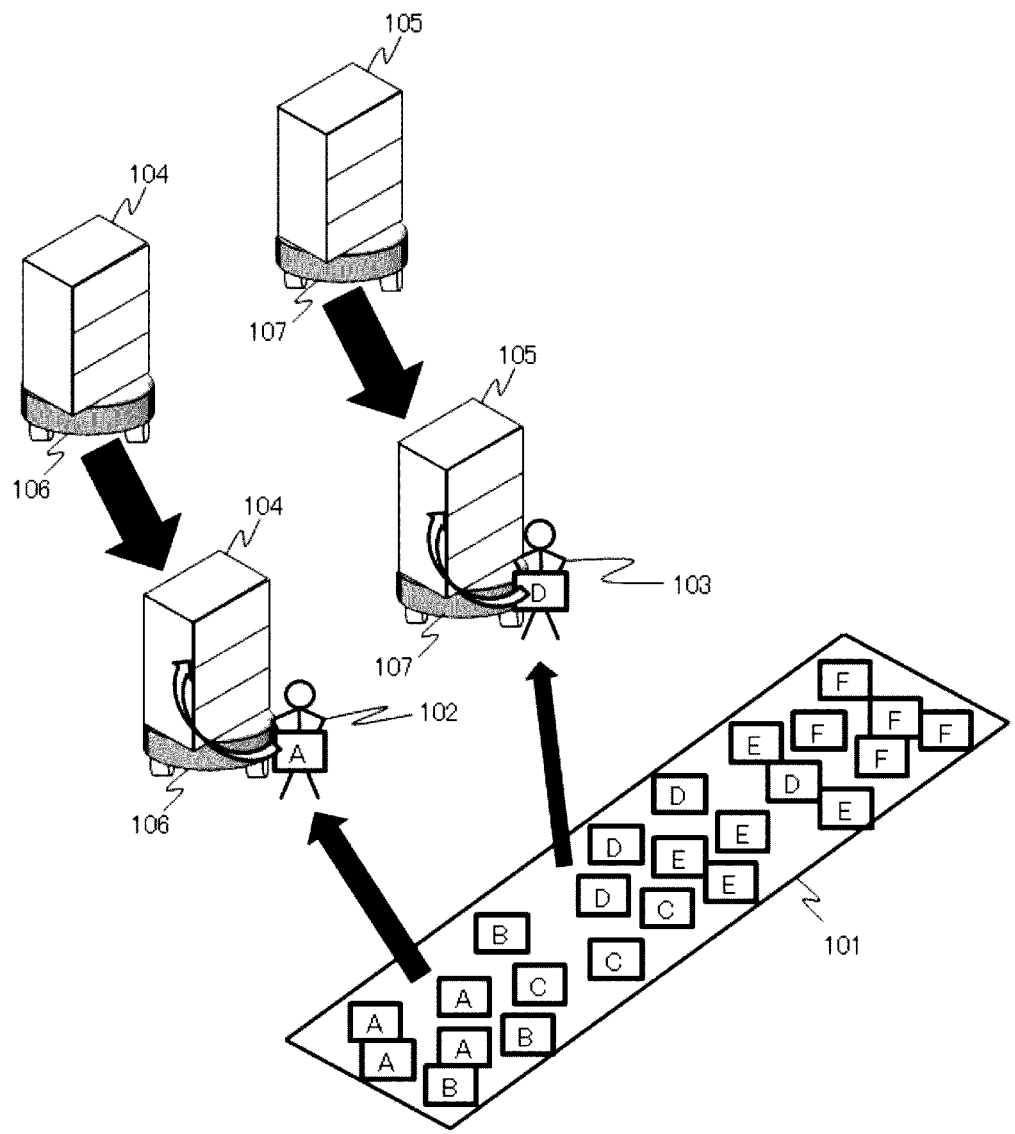

[FIG. 2]
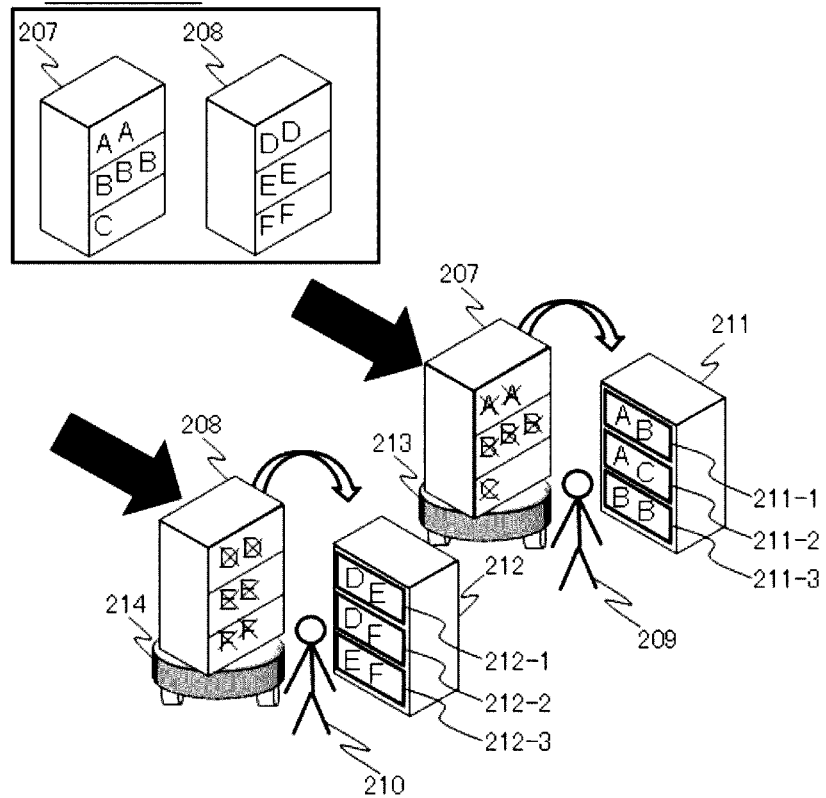

[FIG. 3]
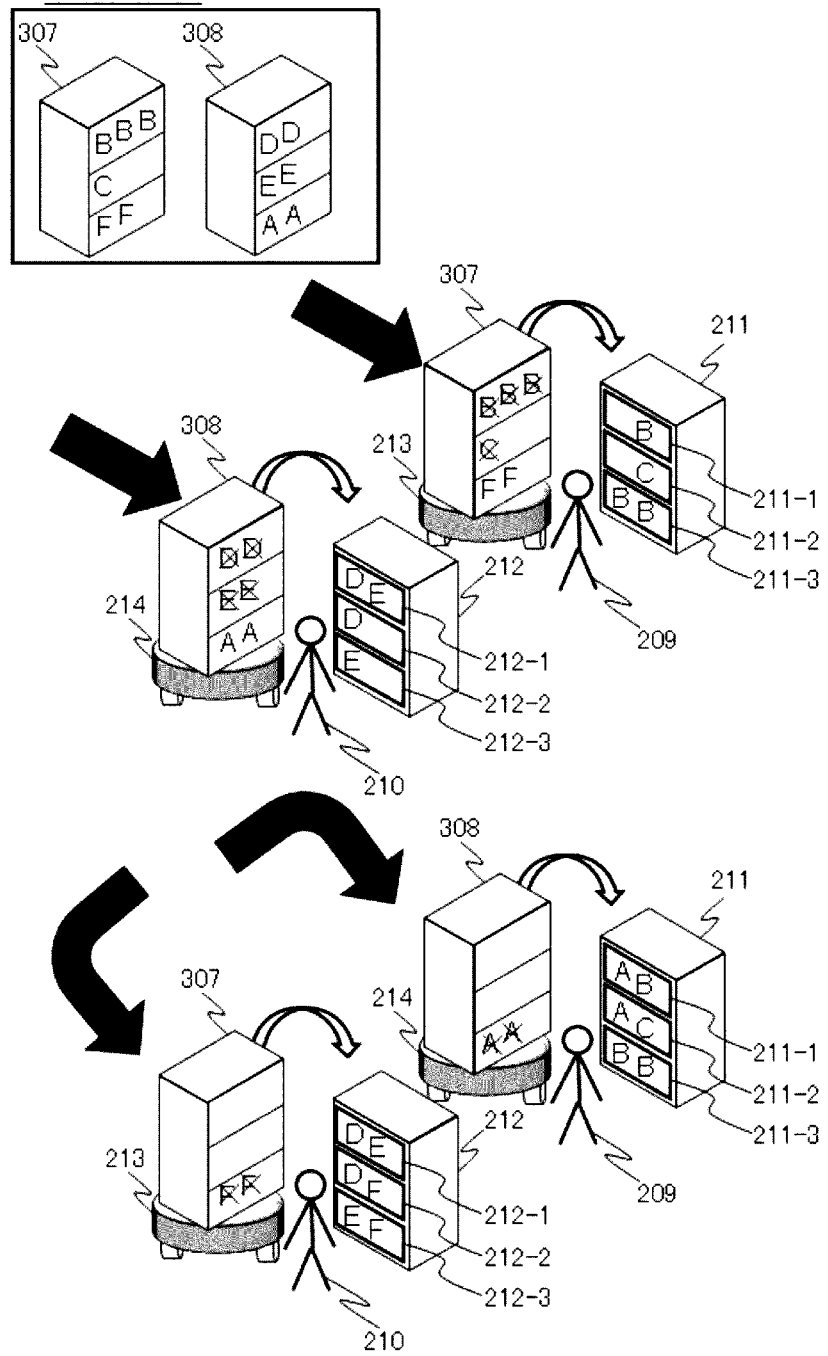

[FIG. 4]
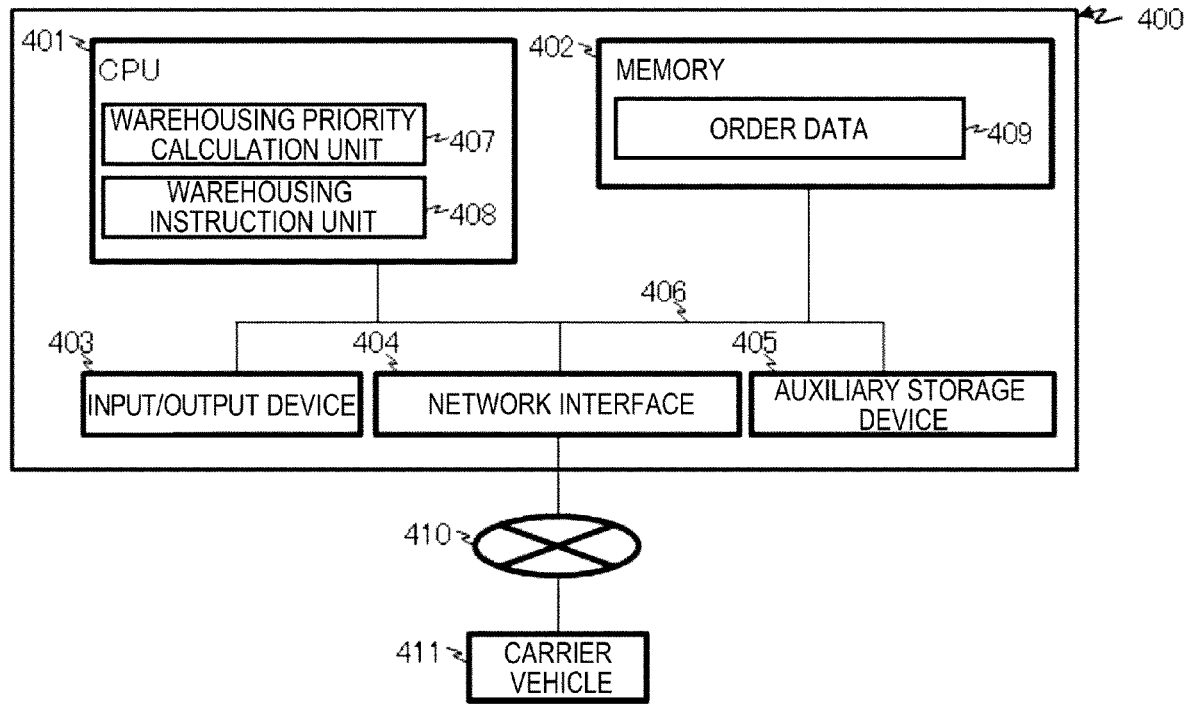
[FIG. 5]
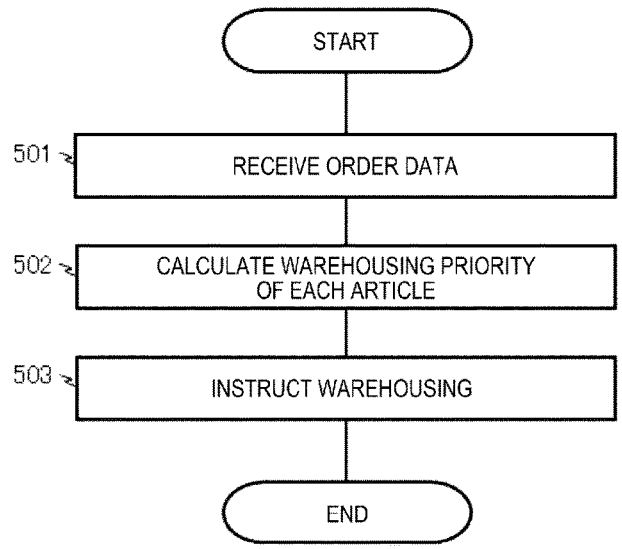

[FIG. 6A]

| ID | ARTICLE NAME | NUMBER | DELIVERY DESTINATION |
|---|---|---|---|
| 1 | A | 10 | C1 |
| 2 | B | 15 | C1 |
| 3 | A | 20 | C2 |
| 4 | C | 5 | C3 |
| 5 | D | 5 | C4 |
| 6 | B | 10 | C5 |
| 7 | C | 15 | C5 |
| 8 | D | 10 | C5 |
| 9 | A | 8 | C6 |
| 10 | B | 8 | C7 |
| ... | | | |

[FIG. 6B]

| ID | ARTICLE NAME | NUMBER | DELIVERY DESTINATION | WAREHOUSING PRIORITY |
|---|---|---|---|---|
| 1 | A | 10 | C1 | 1 |
| 2 | B | 15 | C1 | 3 |
| 3 | A | 20 | C2 | 1 |
| 4 | C | 5 | C3 | 2 |
| 5 | D | 5 | C4 | 2 |
| 6 | B | 10 | C5 | 3 |
| 7 | C | 15 | C5 | 2 |
| 8 | D | 10 | C5 | 2 |
| 9 | A | 8 | C6 | 1 |
| 10 | B | 8 | C7 | 3 |
| ... | | | | |

[FIG. 7]
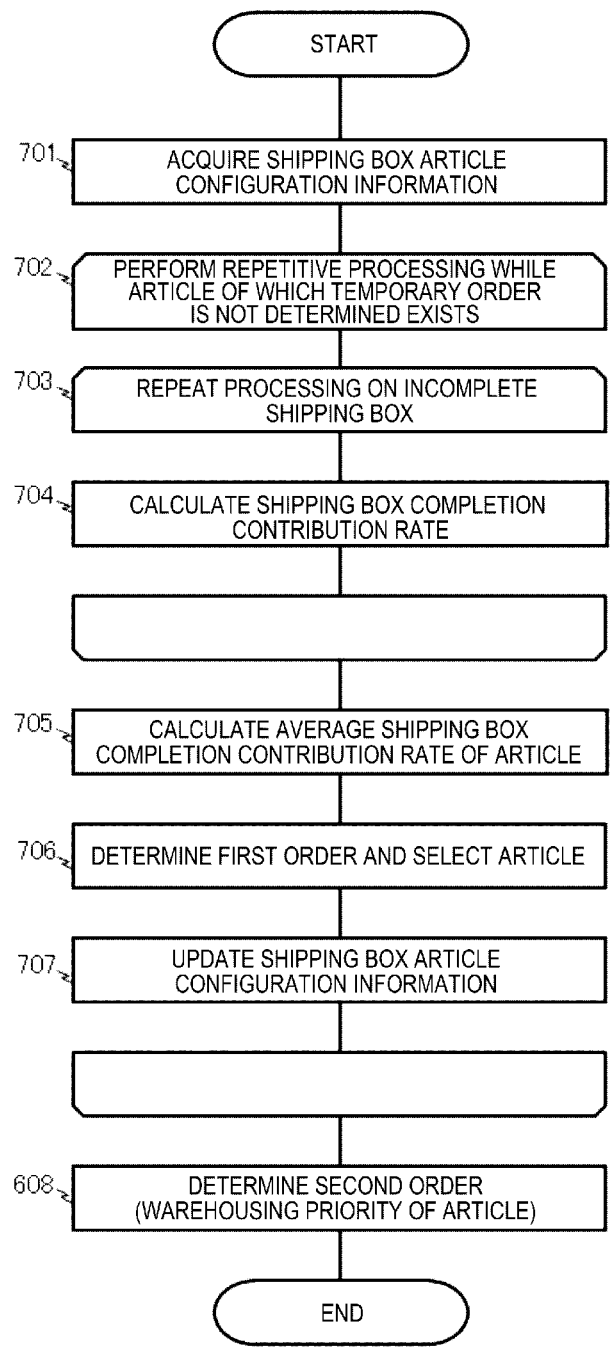

[FIG. 8]
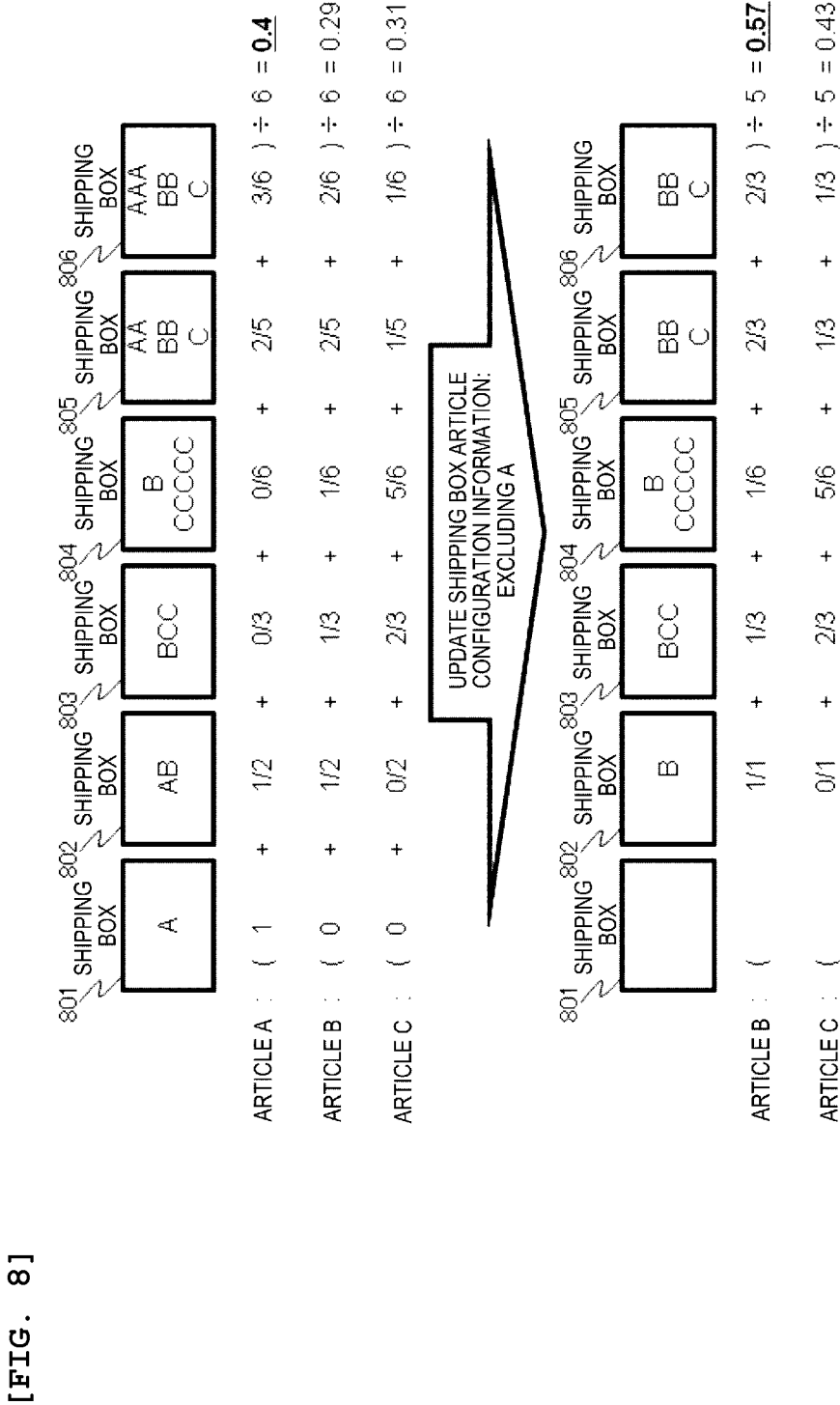

[FIG. 9]
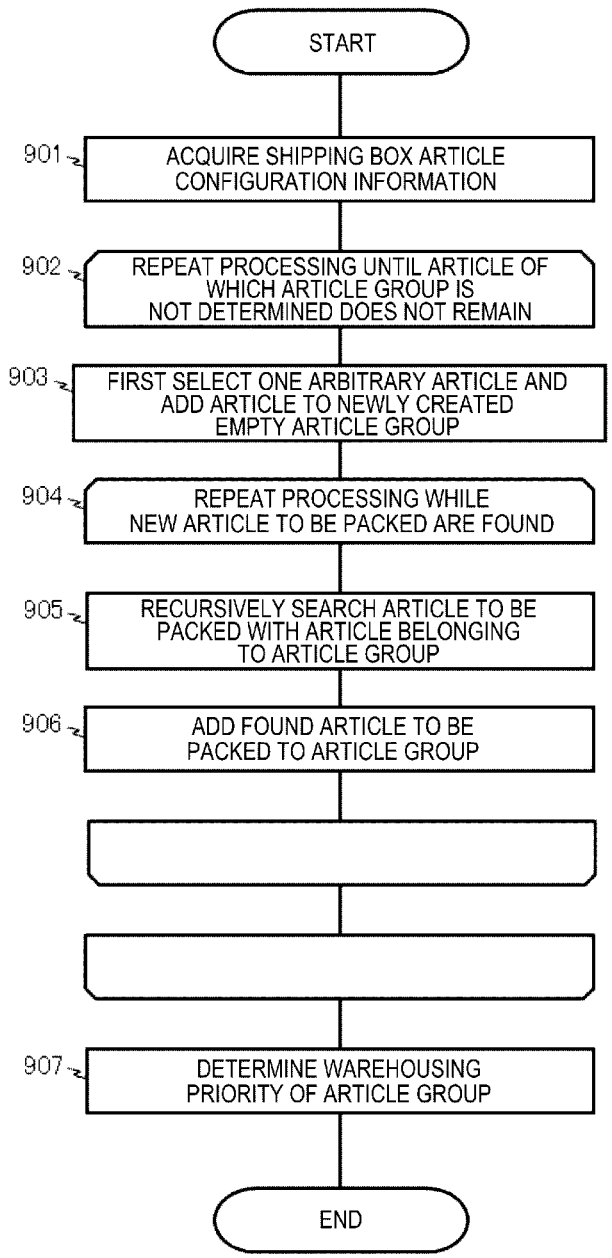

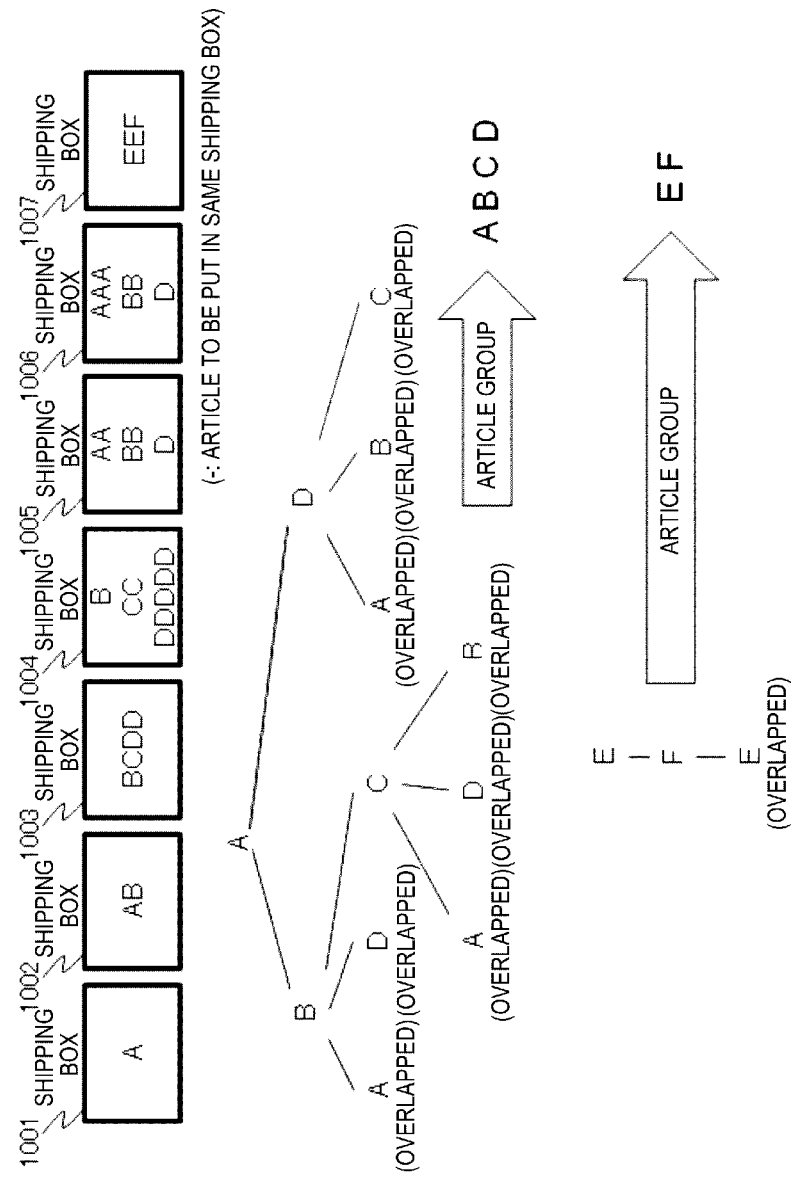
[FIG. 10]

WAREHOUSE MANAGEMENT SYSTEM AND WAREHOUSE MANAGEMENT METHOD

CROSS REFERENCE TO PRIOR APPLICATIONS

This application is a U.S. National Phase application under 35 U.S.C. § 371 of International Application No. PCT/JP2016/056421, filed on Mar. 2, 2016. The International Application was published in Japanese on Sep. 8, 2017 as WO 2017/149695 A1 under PCT Article 21(2). The contents of the above application are hereby incorporated by reference.

TECHNICAL FIELD

The present invention relates to a technique effectively applied to warehouses and factories.

BACKGROUND ART

In a warehouse or a factory, a worker collects articles stored according to orders and sorts the articles into the shipping destination, that is, picking work is performed. Conventionally, as a method of performing picking work, a method in which a worker walks in a warehouse where racks on which articles are stored are arranged and takes out predetermined articles corresponding to orders is used.

In contrast, in recent years, instead of the worker walking in a warehouse and taking out goods, operation of a picking system in which an automatic transport device (transport vehicle) transports a rack to the worker and the worker takes out articles from the transported rack has been popularized. U.S. Pat. No. 8,805,573 (PTL 1) discloses a technique of performing picking by transporting a target article or a rack on which a target article is stored to the location of a picking worker using a transport vehicle in a distribution warehouse.

In the target rack of the picking worker as described above, for example, carried articles are stored in the warehouse in advance. As a method of storing an article in the rack, for example, a method disclosed in JP-A-2000-272722 (PTL 2) is used. PTL 2 discloses that "control means is provided for controlling the operation of transporting means to execute work for carrying articles in and out between each of a plurality of storage sections for storing articles and each of a plurality of article carry-in and -out sections, the plurality of article carry-in and -out sections are managed by grouping under the conditions that adjacent sections are in the same group so that work for carrying articles in the article carry-in and -out sections is preferentially performed before work for carrying articles in and out in the next working order in a case where articles to be carried in the article carry-in and -out sections exist in the same group as the article carry-in and -out sections when work for carrying out the articles is done out based on working order".

CITATION LIST

Patent Literature

PTL 1: U.S. Pat. No. 8,805,573
PTL 2: JP-A-2000-272722

SUMMARY OF INVENTION

Technical Problem

As described above, work for storing a target article to be picked in a rack in advance is warehousing work. An example of warehousing work is shown in FIG. 1.

In the example shown in FIG. 1, a plurality of target articles are temporarily placed in a temporary storage place 101. "A" or the like marked on each article is identification information (for example, product name) of the item of each article. In the following description, for example, an article whose item is "A" is also described as "article A." The same applies to articles of other items. In the example shown in FIG. 1, empty storage racks 104 and 105 are transported to a warehousing work place by transport vehicles 106 and 107. Warehousing workers 102 and 103 sequentially store the articles in the storage racks 104 and 105 in the temporary storage place 101. When the warehousing work is completed, the storage racks 104 and 105 are transported to the picking work place by the transport vehicles 106 and 107.

Reducing the number of trips of a rack is one of approaches for increasing the efficiency of picking work. The picking work of a day is the sum of the time of taking out articles itself and the rack waiting time, and in a case where the number of articles to be shipped per day is determined, while the time for taking out articles is almost fixed, the rack waiting time has room for reduction even in a case where the number of articles is fixed. For example, in a case where an order group of the identification information of the storage racks is created such that the same order belongs to the same group, it is possible to further reduce the number of trips of the storage rack by controlling article warehousing in the storage rack so that continuous picking work can be realized by transporting the storage rack once.

With reference to FIGS. 2 and 3, a description of a change in the number of trips of the storage rack according to the warehousing order in a case of two picking workers will be given. Specifically, in the examples shown in FIGS. 2 and 3, even in a case where articles are stored in each shipping box based on the same order, the number of trips varies depending on the warehousing order of the article in the storage box (that is, the length of time required for the picking work is different).

In FIG. 2, an example is shown in which picking work for respectively packing one article A and one article B in a shipping box 201, one article A and one article C in a shipping box 202, two articles B in a shipping box 203, one article D and one article E in a shipping box 204, one article D and one article F in a shipping box 205, and one article E and one article F in a shipping box 206 according to the order. In the example, two particles A, three articles B, and one article C are stored in a storage rack 207 transported to the picking work place by a transport vehicle 213, and two articles D, two articles E, and two articles F are respectively stored in a storage rack 208 by a transport vehicle 214 in advance by warehousing work.

In this case, the storage racks 207 and 208 are respectively transported to picking workers 209 and 210 and each packing worker sorts the articles in the storage rack 207 and the articles in the storage rack 208 into sorting racks 211 and 212 so that packing work for the shipping boxes 201 to 206 can be started.

In the example, since racks 211-1 to 211-3 included in the sorting rack 211 respectively correspond to the shipping boxes 201 to 206 and racks 212-1 to 212-3 included in the sorting rack 212 respectively correspond to the shipping boxes 204 to 206, all articles stored in the storage rack 207 are sorted into the sorting rack 211 without excess or deficiency and all articles stored in the storage rack 208 are sorted into the sorting rack 212 without excess or deficiency.

The X mark overlapped with the article A of the storage box 207 in FIG. 2 indicates that after the article A is stored in the storage box 207 by the warehousing work, the article is picked by picking work and moved to the sorting rack 211 (that is, the article is no longer stored in the storage box 207). The same applies to other articles and the same also applies to FIG. 3.

In the example shown in FIG. 3, the articles packed in the shipping boxes 201 to 206 are the same as in FIG. 2, but warehousing of articles into storage racks 307 to 308 is different from FIG. 2. Specifically, three articles B, one article C, and two articles F are stored in the storage rack 307 and two articles D, two articles E, and two articles A are respectively stored in the storage rack 308 by warehousing work in advance.

In this case, packing work for the shipping boxes 201 to 206 cannot be started only by transporting the storage racks 307 and 308 to the picking workers 209 and 210 and sorting the articles in the storage rack 307 and the articles in the storage rack 308 into the sorting racks 211 and 212 by each picking worker. This is because while the articles A to be sorted into the sorting rack 211 are not stored in the storage rack 307, the articles F remain in the storage rack 307, and while the articles F to be sorted into the sorting rack 212 are not stored in the storage rack 308, the articles A remain in the storage rack 308.

Therefore, in order to start the packing work for the shipping boxes 201 to 206, it is necessary that the storage racks 308 and 307 are subsequently transported to the picking workers 209 and 210, respectively, and each picking worker sorts the articles of the storage rack 308 and the articles of the storage rack 307 into sorting racks 211 and 212, respectively. That is, compared with the example of FIG. 2, in the example of FIG. 3, the number of trips of the storage racks 307 and 308 increases.

In the method in which adjacent sections among the article carry-in and -out sections are divided in the same group disclosed in PTL 2, it is possible to improve the efficiency of work for carrying the articles in the article carry-in and -out sections and improve the efficiency of work for storing the articles in the storage racks. However, warehousing in which some policies are reflected in delivery cannot be performed and this method does not directly contribute to reducing the number of trips of the storage racks.

Solution to Problem

In order to solve the above problems, a representative aspect of the present invention is as follows. That is, there is provided a warehouse management system has a controller including: a storage unit which stores order information that associates items, numbers, and delivery destinations of articles; a warehousing priority calculation unit that determines warehousing priorities of a plurality of items of articles based on the items and quantities of the articles to be delivered to respective delivery destinations, as specified from the order information; and a warehousing instruction unit that outputs an instruction to store the articles based on the warehousing priorities.

Advantageous Effects of Invention

According to an aspect of the present invention, since articles are warehoused in racks according to priorities based on the information indicating articles to be stored in shipping boxes, it is possible to perform warehousing in which information on shipping boxes is reflected and to improve work efficiency until shipment (delivery, inspection, or the like). The issues, configurations, and effects other than those described above are clarified in the following description of embodiments.

BRIEF DESCRIPTION OF DRAWINGS

FIG. 1 is an explanatory diagram of warehousing work in a warehouse.

FIG. 2 is an explanatory diagram of a first example of picking work in the warehouse.

FIG. 3 is an explanatory diagram of a second example of picking work in the warehouse.

FIG. 4 is an explanatory block diagram of a hardware configuration of a controller in Embodiment 1 of the present invention.

FIG. 5 is a flowchart for explaining a warehousing procedure in Embodiment 1 of the present invention.

FIG. 6A is an explanatory diagram of a specific example of order data received by the controller and stored in a memory in Embodiment 1 of the present invention.

FIG. 6B is an explanatory diagram of a specific example of order data with the warehousing priority of each article determined by a warehousing priority calculation unit of the controller in Embodiment 1 of the present invention.

FIG. 7 is a flowchart showing processing performed by a warehousing priority calculation unit of a controller in Embodiment 2 of the present invention.

FIG. 8 is an explanatory diagram of a specific example of the processing performed by the warehousing priority calculation unit of the controller in Embodiment 2 of the present invention.

FIG. 9 is a flowchart showing processing performed by a warehousing priority calculation unit of a controller in Embodiment 3 of the present invention.

FIG. 10 is an explanatory diagram of a specific example of the processing performed by the warehousing priority calculation unit of the controller in Embodiment 3 of the present invention.

DESCRIPTION OF EMBODIMENTS

Hereinafter, embodiments will be described with reference to the drawings.

Embodiment 1

FIG. 4 is an explanatory block diagram showing a hardware configuration of a controller 400 in Embodiment 1 of the present invention.

The controller 400 configuring a warehouse management system of the embodiment is a common computer and has a central processing unit (CPU) 401, a memory 402, an input/output device 403, a network interface 404, and an auxiliary storage device 405. The CPU 401, the memory 402, the input/output device 403, the network interface 404, and the auxiliary storage device 405 are connected with one another through a bus 406.

The CPU 401 performs various arithmetic operations. The auxiliary storage device 405 is a non-volatile and non-transitory storage medium, and various programs and data stored in the auxiliary storage device 405 are loaded to the memory 402 and the CPU 401 executes the various programs loaded on the memory 402 to read and write various data loaded on the memory 402.

The CPU 401 has the warehousing priority calculation unit 407 and the warehousing instruction unit 408. In the memory 402, programs and order data 409 respectively corresponding to the warehousing priority calculation unit 407 and the warehousing instruction unit 408 are stored. The CPU 401 executes these programs stored in the memory 402 to implement the functions of the warehousing priority calculation unit 407 and the warehousing instruction unit 408.

The order data 409 stored in the memory 402 is to register identification information of each article to be delivered, the number of the articles to be delivered, and the delivery destination. The details of the order data 409 will be described with FIG. 6A.

The network interface 404 includes an interface for communicating data with a customer system or the like through a network 410, an interface for communicating data with a work instruction device installed in a workstation, and an interface for communicating data with the transport vehicle 411. The controller 400 and the work instruction device can be connected by wire or wireless, although the controller 400 and the transport vehicle 411 are connected by wireless. Although one transport vehicle 411 is shown in FIG. 4, a plurality of transport vehicles 411 may be actually connected to the network 410 and the respective transport vehicles 411 correspond to transport vehicles 106, 107, 213, and 214 shown in FIGS. 1 to 3.

FIG. 5 is a flowchart for explaining a warehousing procedure in Embodiment 1 of the present invention.

First, the controller 400 receives order data and stores the received order data in the memory 402 (Step 501).

Next, the controller 400 calculates warehousing priorities of each article from the order data 409 received and stored in the memory 402 by the function of the warehousing priority calculation unit 407 based on the items and quantities of articles to be stored in each shipping box (that is, to be delivered to each delivery destination) (Step 502).

Next, the controller 400 sends an instruction to a system for warehousing according to the calculated warehousing priorities through the work instruction device having the function of the warehousing instruction unit 408 (Step 503). Specifically, the controller 400 may output an instruction to preferentially store an article of which the calculated warehousing priority is high in the storage rack through the input/output device 403 or through a terminal device (not shown) of a warehousing worker connected to the network 410 from the network interface 404.

Further, the controller 400 may send an instruction to the transport vehicle 411 to transport the storage rack to the warehousing work place in Step 503. According to the instruction, for example, as shown in FIG. 1, the transport vehicle 106 or the like transports the storage rack 104 or the like and a warehousing worker 102 or the like can start warehousing work using the storage rack 104 or the like.

Next, the order data 409 of Embodiment 1 will be described.

FIG. 6A is an explanatory diagram of a specific example of the order data 409 received by the controller 400 and stored in the memory 402 in Embodiment 1 of the present invention.

The order data 409 includes IDs 601, article names 602, numbers 603, and delivery destinations 604. In each ID 601, identification information of each row (order line) of the order data 409 is registered. In each article name 602, identification information of the article to be delivered is registered. The identification information of the article is to identify the kind (item) of the article. In each number (quantity) 603, the number of articles to be delivered is registered. In each delivery destination 604, the delivery destination of the article (for example, a shipping destination in a case where the article to be handled is an article to be shipped to a store) is registered.

Here, one order is received in the form where identification information of at least one article to be delivered to a delivery destination and the number of articles are associated with one delivery destination; however, each order line of the order data 409 is set for one article; accordingly, one order can be registered into multiple order lines in some cases. For example, an order to a delivery destination "C1" is registered in two order lines of "1" and "2" of the IDs 601 shown in FIG. 6A.

FIG. 6B is an explanatory diagram of a specific example of order data 409 with the warehousing priority of each article name determined by the warehousing priority calculation unit 407 of the controller 400 of Embodiment 1 of the present invention.

In the example in FIG. 6B, the warehousing priorities of the articles A, B, C, and D are determined as 1, 3, 2, and 2, respectively, and the order data 409 to which the respective values are added as warehousing priorities 605 of respective lines is shown. The warehousing instruction unit 108 instructs warehousing in the descending order of warehousing priority (that is, in the ascending order of the value of the warehousing priority 605). At this time, when the warehousing instruction unit 108 transmits an instruction to transport the storage rack to the transport vehicle 411, for example, as shown in FIG. 1, the transport vehicles 106 and 107 transport the storage racks 104 and 105 to the place for warehousing work for the warehousing workers 102 and 103.

The warehousing worker 102 or the like preferentially warehouses an article having a small warehousing priority value to an article having a large warehousing priority value in the storage rack 104 or the like. However, the warehousing orders of the articles having the same warehousing priority value may be arbitrary. For example, a plurality of temporary storage places corresponding to the priorities of the articles may be provided, articles having high priority may be temporarily placed in the temporary storage place for high priority, and the worker 102 or the like may warehouse articles sequentially from the articles placed in the temporary storage place for high priority.

Then, the articles stored in the storage racks in this manner are targets for picking for sorting the articles into each shipping destination. For example, in a case where the above-described warehousing work is performed with respect to the storage racks 207 and 208 shown in FIG. 2, the storage racks 207 and 208 are then transported to the picking work place by the transport vehicles 213 and 214 and the picking workers 209 and 210 perform picking for the articles in these storage racks for sorting the articles into each shipping destination.

According to the invention disclosed in PTL 2, it is possible to improve the efficiency of work for carrying the articles in the article carry-in and -out sections and improve the efficiency of work for storing the articles in the storage racks. However, warehousing in which some policies are reflected in delivery cannot be performed. On the other hand, in the embodiment, the order data, that is, information on the association between the delivery destination and the article can be reflected at the time of warehousing and thus work efficiency until shipment (delivery, inspection, or the like) can be improved.

The present invention can be applied to any kind of warehouse such as warehouses for storing articles carried in a factory and delivering the articles in the factory, warehouses for storing articles shipped from a factory, and the like, as well as distribution warehouses for store and sorting products shipped to each store, as long as the warehouse is a warehouse for warehousing, sorting and shipping articles.

Embodiment 2

In the embodiment, as a specific example of the warehousing priority, the warehousing priority for early completion of the shipping box will be described. Since each part of the system of Embodiment 2 has the same function as each part denoted by the same reference numeral in Embodiment 1 shown in FIGS. 1 to 6B except for the differences described below, the descriptions thereof will be omitted.

FIG. 7 is a flowchart showing processing performed by the warehousing priority calculation unit 407 of the controller 400 of Embodiment 2 of the present invention.

Specifically, FIG. 7 shows a flow of processing for giving the warehousing priority for early completion of the shipping box by two-stage order determination. This processing is performed in Step 502 in FIG. 5.

First, the warehousing priority calculation unit 407 acquires an input of article configuration information for each shipping box (Step 701). Next, the warehousing priority calculation unit 407 performs repetitive processing performed while an article of which the first stage order is not determined using the shipping box completion contribution ratio described below exists (Step 702). Specifically, in the repetitive processing, by performing the repetitive processing (Step 703) with respect to incomplete shipping boxes, that is, all shipping boxes in which articles to be put in boxes remain in the calculation processing, the shipping box completion contribution ratio of an article of which the first stage order is not determined for each shipping box (Step 704). The shipping box completion contribution ratio contrib (Item$_n$, Box$_b$) of the article Item$_n$ in the shipping boxes Box$_b$ is calculated by Expression (1).

[Expression 1]

$$contrib(Item_n, Box_b) = \frac{num(Item_n, Box_b)}{\sum_{Item \in Box_b} num(Item, Box_b)} \quad (1)$$

Here, num (Item$_n$, Box$_b$): number of deficient articles Item$_n$ in shipping box Box$_b$ The calculated shipping box completion contribution ratio contrib (Item$_n$, Box$_b$) is an index for indicating a degree of contribution of storage of the article Item$_n$ in the shipping box Box$_b$ to completion of the shipping box Box$_b$. Here, the completion of the shipping box means completion of sorting of all articles to be shipped to the shipping destination (delivery destination) of the shipping box Box$_b$ based on the order data 409, and specifically means that, for example, all articles to be stored in the shipping box Box$_b$ are stored in the shipping box Box$_b$. That is, the shipping box completion contribution ratio contrib (Item$_n$, Box$_b$) can be paraphrased as an index for indicating a degree of contribution of sorting of the articles Item$_n$ into delivery destinations to completion of sorting into the delivery destination. The number of deficient articles Item$_n$ in the shipping box Box$_b$ is a value indicating the number of remaining articles obtained by subtracting the number of articles Item$_n$ to be already stored in the shipping box Box$_b$ from the total number of articles Item$_n$ to be stored in the shipping box Box$_b$. However, as described later, the calculation of the processing in FIG. 7 is performed on the assumption that the articles actually yet not stored in the shipping box is already stored in the shipping box in some cases. A specific example of such calculation will be described later (refer to FIG. 8).

When the calculation of the shipping box completion contribution ratio for all incomplete shipping boxes is completed, the warehousing priority calculation unit 407 calculates the average shipping box completion contribution ratio for each article Item$_n$ (Step 705). The average shipping box completion contribution ratio for each article Item$_n$ is calculated by Equation (2). That is, the average value of the shipping box completion contribution ratios of the articles Item$_n$ in the incomplete shipping box at this point is calculated.

[Expression 2]

$$E_{contrib}(Item_n; B) = \frac{1}{\#B} \sum_{Box \in B} contrib(Item_n, Box) \quad (2)$$

Here,

B: collection of incomplete shipping boxes at this point

Next, the warehousing priority calculation unit 407 selects one article having the highest average shipping box completion contribution ratio at this point and the first stage order of the article is determined as an order next to the first stage order of the article of which the temporary order determination is completed (Step 706) and then the shipping box article configuration information is updated such that the article is excluded from the shipping box article configuration information (Step 707). The reason for updating the shipping box article configuration information such that the article is excluded from the shipping box article configuration information is that the article of which the first stage order is determined in the calculation is handled as an article put in the shipping box and the article is excluded from articles to be put in the shipping box (that is, the article not yet put in the shipping box).

Finally, the warehousing priority calculation unit 407 determines the second stage order for each article (Step 708). The second stage orders 1 to L corresponding to the articles of the first stage order j (where 1≤j≤N) are determined by Expression (3).

[Expression 3]

$$[(f-1)L/N]+1 \quad (3)$$

The second stage order determined by the above-described processing is determined as warehousing priority based on the shipping box article configuration information. However, the smaller the numerical value of warehousing priority is, the higher the priority order is.

In this manner, the warehouse management system in the embodiment calculates the warehousing priority of the article based on the shipping box completion contribution ratio.

FIG. 8 is an explanatory diagram of a specific example of the processing performed by the warehousing priority calculation unit 407 of the controller 400 in Embodiment 2 of the present invention.

FIG. 8 is an example in which repeated calculation is performed from Step 702 to Step 707 in a case where three kinds of articles A, B, and C are shipped to each store by using shipping boxes 801 to 806. The kinds and number of articles to be packed in each shipping box (that is, how many articles are shipped to which shipping destination) are specified based on the order data 409.

The numerical values described in the shipping boxes 801 to 806 in the upper half of FIG. 8 are respective shipping box completion contribution ratios of the three kinds of articles A, B, and C calculated in Step 704. The calculation expression corresponding to each of the articles A, B, and C is an expression for calculating the average value of shipping box completion contribution ratios of the respective articles in Step 705.

For example, while the shipping box 805 is completed by storing two articles A, two articles B, and one article C, an article is no longer stored at the time when the loop of Step 703 is first executed, and thus the numbers of deficient articles A, B, and C at that time are 2, 2, and 1, respectively, and the total number of the particles is 5. In this case, the shipping box completion contribution ratios of the articles A, B, and C are 2/5, 2/5 and 1/5, respectively. Similarly, when the shipping box completion contribution ratio is calculated for other shipping boxes and the average values of the shipping box completion contribution ratios of the articles A, B and C, are calculated, average values of 0.4, 0.29, and 0.31 are obtained, respectively.

The average value of the shipping box completion contribution ratios of each article calculated in Step 705 is used and the article A is selected as an article having the largest average shipping box completion contribution ratio in Step 706. Here, the first place is given to the selected first article A as the first stage order.

The numerical values described under each shipping box in the lower half of FIG. 8 are the shipping box completion contribution ratios of the two kinds of remaining articles B and C calculated in Step 704 after updating the shipping box article configuration information such that the article A for which the first stage order is determined is removed from the shipping box article configuration information in Step 701. The calculation expression corresponding to each of the articles B and C is an expression for calculating the average value of the shipping box completion contribution ratios of the respective articles in Step 705.

For example, at the time when the loop of Step 703 is performed twice, none of the articles are actually stored in the storage box. However, assuming that the article A having the first place in the above-mentioned first stage order is stored, the numbers of deficient articles A, B, and C in the shipping box 805 are 0, 2, and 1, respectively, and the total number of deficient articles is 3. In this case, the shipping box completion contribution ratios of the articles B and C are 2/3 and 1/3, respectively. Similarly, when the shipping box completion contribution ratio is calculated for other shipping boxes and the average values of the shipping box completion contribution ratios of the articles B and C are calculated, average values of 0.57 and 0.43 are obtained respectively.

The average value of the shipping box completion contribution rates of each article calculated in Step 705 is used, and the article B is selected as an article having the largest average shipping box completion contribution ratio in step 706. Here, the second place is given to the secondly selected article B as the first stage order. At this time, the third place is given to the remaining article C as the first stage order.

In a case where the number of kinds (items) of articles handled is small as in the example of FIG. 8, by setting the value of L in Expression (3) above to the same value as the number of articles (3 in the example of FIG. 8), the first stage order may be used as it is in the second stage order. However, when the number of articles handled is increased in an actual warehouse and the like, it is difficult for the warehousing worker to find one item of article to be worked among a large number of articles placed in the temporary storage place. In this case, by setting the second stage order to be larger than the first stage order using Expression (3), the number of articles corresponding to each order is increased and thus the warehousing worker more easily finds the article to be worked and the work efficiency is improved.

As described above, by performing warehousing work according to the order based on the magnitude of the average value of the shipping box completion contribution ratios, the probability of continuously picking articles from the same storage rack in the subsequent picking work can be increased and this the work efficiency is improved. In addition, the fact that the shipping box completion contribution ratio of a certain article is large indicates that the degree of the shipping box approaching completion by storing the article in the shipping box is large. When the article having a large average shipping box completion contribution ratio is preferentially warehoused, picking work is done in that order, and the shipping boxes that are easy to be completed are preferentially completed. Thus, the timing of completion of a plurality of shipping boxes is dispersed, the load of the shipping work is leveled, and as a result, the working efficiency is improved.

Embodiment 3

In the embodiment, as a specific example of the warehousing priority, the warehousing priority will be described based on the packing relationship between the articles. Since each part of the system of Embodiment 3 has the same function as each part denoted by the same reference numeral in Embodiment 1 shown in FIGS. 1 to 6B except for the differences described below, the descriptions thereof will be omitted.

FIG. 9 is a flowchart showing processing performed by the warehousing priority calculation unit 407 of the controller 400 in Embodiment 3 of the present invention.

Specifically, FIG. 9 is a flowchart showing a flow of the processing of determining warehousing priority for improving the continuous picking probability. In the flowchart, an undirected graph in which articles that can be packed are connected with lines is separated by connection components, the articles belonging to each connection component are collected as article groups, and then the groups of articles are classified into groups corresponding to warehousing priorities.

Finally, the warehousing priority calculation unit 407 acquires an input of article configuration information for each shipping box (Step 901). Next, in a case where there are one or more articles of which the article group is not determined to be determined (Step 902), the warehousing priority calculation unit 407 selects one of the articles and adds the article to a newly created article group (Step 903), and until no new article can be found in the same shipping box as the article (Step 904), and the processing of adding an article that is put in the same shipping box as the added article to the article group is repeated (Steps 904 and 905). When an article of which the article group to belong is not determined remains, the process returns to Step 902.

Next, the warehousing priority calculation unit 407 determines the warehousing priorities 1 to L for each article (Step 907). Here, the warehousing priority calculation unit 407 determines the warehousing priorities 1 to L so that the same warehousing priority is given to all articles included in the same article group. In a case where the number of article groups M is larger than L, M article groups are reconstituted to L warehousing priority groups by collecting a plurality of article groups, and the warehousing priorities 1 to M of each warehousing priority group are arbitrarily determined. In a case where the number of article groups M is smaller than L, M article groups are considered as M warehousing priority groups as they are and the warehousing priorities 1 to M of each warehousing priority group are arbitrarily determined.

Due to the definition of the reconstituted article warehousing priority group, it is not possible for an article entering a certain warehousing priority group and an article entering a warehousing priority group different from the warehousing priority group of the article to enter the same shipping box. In this case, by bringing the timings of warehousing of the articles entering the same warehousing priority group (having the same loading priority) close to each other, articles entering a warehousing priority group different from the warehousing priority groups of the articles warehoused in the same rack are easily excluded and thus the probability of continuously picking articles from the same storage rack can be increased.

FIG. 10 is an explanatory diagram of a specific example of the processing performed by the warehousing priority calculation unit 407 of the controller 400 in Embodiment 3 of the present invention.

FIG. 10 is an example in which repeated calculation is performed from Step 903 to Step 906 in a case where six kinds of articles A to F are shipped to each store by using shipping boxes 1001 to 1006. The kinds and number of articles to be packed in each shipping box (that is, how many articles are shipped to which shipping destination) are specified based on the order data 409.

The upper half of FIG. 10 shows the processing of recursively searching the packaged articles that enter the same shipping box as an arbitrarily selected article A.

After selecting an article A arbitrarily selected in Step 903 and adding the article to a newly created empty article group, the warehousing priority calculation unit 407 searches an article to be put in the same shipping box as the article A from Step 904 to Step 906. In the example in FIG. 10, articles B and articles A are put in shipping boxes 1002, 1005, and 1006 and articles D and the articles A are put in the shipping boxes 1005 and 1006. Therefore, in Step 905, the articles B and D are obtained and in Step 906, the obtained articles are added to the same article group as the article A (hereinafter, referred to as a first article group). Further, the warehousing priority calculation unit 407 searches the article to be out in the same shipping box as the articles B and D by applying Steps 904 to 906 to the articles B and D. In this manner, the warehousing priority calculation unit 407 repeatedly searches for articles that are put in the same shipping box and adds the articles entering the same article group until a new packaged article is no longer found.

In the example in FIG. 10, the articles A and the articles B are put in the shipping boxes 1002, 1005, and 1006, the articles D and the articles B are put in the shipping boxes 1003, 1004, 1005, and 1006, and the articles C and the articles B are put in the shipping boxes 1003 and 1004. Since the articles A and D are included in the first article group among these articles, the articles C are newly added to the first article group. Further, when steps 904 to 906 are performed on the article C, the articles B and D and the articles C are put in the shipping boxes 1003 and 1004. However, these articles are not included in the first article group. This is because regarding the article A, a new packaged article is no longer found, and thus the loop from Step 904 to Step 906 is once completed.

As a result, it is indicated that the connection component including the article A is constituted of the articles A to D. Here, the warehousing priority calculation unit 407 collects the articles A to D constituting the connection component as the same article group (first article group) and sets the articles A to D as article group determined articles. For example, when the memory 402 stores the information indicating the article group to which each article belongs and the article group to which each article belongs is determined, the warehousing priority calculation unit 407 may update the information.

As described above, at the time when the loop of Steps 904 to 906 is once completed, in the example in FIG. 10, the article group to which the articles E and F belong is not determined (Step 902), and thus among the respective articles, one arbitrary article, for example, the article E is selected (Step 903). In the lower half of FIG. 10, an example in which with the article E arbitrarily selected as described above as a starting point, searching for articles that are recursively put in the same shipping box from Steps 904 to 906 similarly is repeated until a newly packaged article is no longer found. In the example, the articles E and the articles F are put in the shipping box 1007, and the articles E and the articles F are not put in other shipping boxes. As a result, it is indicated that the connection component including the article E is constituted of the articles E and F. Here, the warehousing priority calculation unit 407 collects the articles E and F constituting the connection component as the same article group (for example, a second article group), and sets the articles E and F as article group determined articles. In the example in FIG. 10, article groups to which all the articles belong r can be determined.

Arbitrary methods can be applied as a method of collecting articles and a method of allocating the warehousing priority to the reconstituted warehouse priority group at the time of reconstitution of the warehousing priority group.

According to Embodiment 3 of the present invention, the same warehousing priority is given to a plurality of articles to be put in the same shipping box (that is, to be shipped to the same shipping destination) and different warehousing priorities are given to a plurality of articles not to be put in the same shipping box (that is, that is, not to be shipped to the same shipping destination), respectively. When warehousing work is performed according to the warehousing priority determined in this manner, the plurality of articles to be put in the same shipping box are easily put in the same storage rack and the plurality of articles not to be put in the same shipping box are not easily put in the same storage rack. It is possible to increase the probability of continuously picking articles from the same storage rack in the subsequent picking work, thereby improving working efficiency.

In the above processing, different warehousing priorities are given to the plurality of articles not to be put in the same shipping box. However, it is not yet determined to which article higher warehousing priority is given. Here, the warehousing priority calculation unit 407 may further determine the warehousing priorities of the respective article groups by executing the same processing as in Embodiment 2. For example, the warehousing priority calculation unit 407 may calculate the shipping box completion contribution ratio of each article included in each article group to set the warehousing priority of an article group including an article having a higher shipping box completion contribution ratio to be high. Accordingly, the probability of continuously picking articles is increased and the time when the shipping box is completed is leveled out. Thus, the work efficiency is further improved.

It should be noted that the present invention is not limited to the above-described embodiments but includes various modifications. For example, the above-described embodiments have provided details for the sake of better understanding of the present invention; they are not limited to those including all the configurations that have been described. Apart of the configuration of each embodiment may be replaced with a configuration of another embodiment or a configuration of an embodiment may be incorporated to a configuration of another embodiment. A part of the configuration of each embodiment may be added, deleted, or replaced by that of a different configuration.

The above-described configurations, functions, and processing units, and processing means, for all or a part of them, may be implemented by hardware: for example, by designing an integrated circuit. The above-described configurations and functions may be implemented by software, which means that a processor interprets and executes programs providing the functions. The information of programs, tables, and files to implement the respective functions can be stored in a storage device such as a non-volatile semiconductor memory, a hard disk drive, or a solid state drive (SSD), or a non-transitory computer-readable storage medium such as an IC card, an SD card, or a DVD.

The drawings shows control lines and information lines as considered necessary for explanations but do not show all control lines or information lines in the products. It can be considered that most of all components are actually interconnected.

The invention claimed is:

1. A warehouse management system comprising:
a controller including
a storage unit which stores order information that associates items, numbers, and delivery destinations of articles;
a warehousing priority calculation unit that determines warehousing priorities of a plurality of items of articles based on the items and quantities of the articles to be delivered to respective delivery destinations, as specified from the order information;
wherein the warehousing priority calculation unit calculates a contribution ratio indicating a degree of contribution of sorting of the respective items of articles into the respective delivery destinations based on the order information to completion of sorting into the respective delivery destination and determines the warehousing priority based on the contribution ratio; and
a warehousing instruction unit that outputs an instruction to store the articles based on the warehousing priorities.

2. The warehouse management system according to claim 1,
wherein the warehousing priority calculation unit determines the warehousing priority such that an article of an item having a high contribution ratio has high priority.

3. The warehouse management system according to claim 2,
wherein the warehousing priority calculation unit calculates an average value of the contribution ratios related to a plurality of delivery destinations for each item and determines the warehousing priority such that an article of an item having a large average value has high priority.

4. The warehouse management system according to claim 3,
wherein the contribution ratio indicating a degree of contribution of sorting of the respective items of articles into the respective delivery destinations to completion of sorting into the respective delivery destinations is a ratio of quantity of the respective items of articles sorted into the respective delivery destinations with respect to a quantity of articles not sorted in quantity of all items of total articles sorted into the respective delivery destinations,
the warehousing priority calculation unit
determines a first warehousing priority for an article of an item having a largest average value,
calculates, in a case where it is assumed that sorting of all articles of the item having the largest average value into the respective delivery destinations is completed, an average value of the contribution ratios for articles of the remaining items, and
determines a second warehousing priority, which is lower than the first warehousing priority, for an article of an item of which the average value of the contribution ratios calculated for the articles of the remaining items is largest.

5. The warehouse management system according to claim 1, further comprising:
a transport vehicle that communicates with the controller through a network and transports a storage rack for storing a target article to be picked for sorting,
wherein the warehousing instruction unit determines the warehousing priority and then transmits an instruction to the transport vehicle to transport the storage rack to a place for performing warehousing work, and
the respective articles are stored in the storage rack according to the warehousing priority.

6. A warehouse management method executed by a warehouse management system having a processor, and a storage device that is connected to the processor, the storage device storing order information that associates items, numbers, and delivery destinations of goods with one another, the method comprising:
a first step of causing the processor to determine warehousing priorities of a plurality of items of articles based on the items and quantities of the articles to be delivered to respective delivery destinations as specified from the order information;
wherein the processor calculates a contribution ratio indicating a degree of contribution of sorting of the respective items of articles into the respective delivery destinations based on the order information to completion of sorting into the respective delivery destinations and determines the warehousing priority based on the contribution ratio; and
a second step of causing the processor to output an instruction to store the articles based on the warehousing priorities.

7. The warehouse management method according to claim 6,
wherein in the first step, the processor determines the warehousing priority such that an article of an item having a high contribution ratio has high priority.

8. The warehouse management method according to claim 7,
wherein in the first step, the processor calculates an average value of the contribution ratios related to a plurality of delivery destinations for each item and determines the warehousing priority such that an article of an item having a large average value has high priority.

9. The warehouse management method according to claim 8,
wherein the contribution ratio indicating a degree of contribution of sorting of the respective items of articles into the respective delivery destinations to completion of sorting into the respective delivery destinations is a ratio of quantity of the respective items of articles sorted into the respective delivery destinations with respect to a quantity of articles not sorted in quantity of all items of total articles sorted into the respective delivery destinations, and
the first step includes
a step of causing the processor to determine to a first warehousing priority for an article of an item having a largest average value,
a step of causing the processor to calculate, in a case where it is assumed that sorting of all articles of the item having the largest average value into the respective delivery destinations is completed, an average value of the contribution ratios for articles of the remaining items, and
a step of causing the processor to determine a second warehousing priority, which is lower than the first warehousing priority, for an article of an item of which the average value of the contribution ratios calculated for the articles of the remaining items is largest.

10. The warehouse management method according to claim 6,
wherein the warehouse management system further includes an interface that is connected to the processor and a transport vehicle that is connected to the interface through a network and transports a storage rack for storing a target article to be picked for sorting,
the second step includes a step of determining the warehousing priority and then transmitting an instruction to the transport vehicle to transport the storage rack to a place for performing warehousing work, and
the respective articles are stored in the storage rack according to the warehousing priority.

\* \* \* \* \*